US012465672B1

(12) United States Patent
Simantov (10) Patent No.: US 12,465,672 B1
(45) Date of Patent: Nov. 11, 2025

(54) DEVICES AND METHODS FOR REMOVING CANCER CELLS FROM BLOODSTREAM DURING CANCER METASTASIS

(71) Applicant: MIRACLE HEART, Sydney (AU)

(72) Inventor: Binyamin Simantov, Sydney (AU)

(73) Assignee: Miracle Heart, Sydney (AU)

( * ) Notice: Subject to any disclaimer, the term of this patent is extended or adjusted under 35 U.S.C. 154(b) by 0 days.

(21) Appl. No.: 19/071,140

(22) Filed: Mar. 5, 2025

Related U.S. Application Data

(63) Continuation of application No. 19/053,972, filed on Feb. 14, 2025.

(51) Int. Cl.
*G01N 33/58* (2006.01)
*A61B 6/58* (2024.01)
(Continued)

(52) U.S. Cl.
CPC ........... *A61M 1/3618* (2014.02); *A61B 6/587* (2013.01); *A61B 6/588* (2013.01); *A61M 1/3486* (2014.02); *A61M 1/3601* (2014.02); *A61M 1/3683* (2014.02); *A61N 5/1048* (2013.01); *B01L 3/502761* (2013.01); *B03C 1/00* (2013.01); *B03C 1/005* (2013.01); *B03C 1/01* (2013.01); *B03C 1/04* (2013.01); *B03C 1/06* (2013.01); *B03C 1/08* (2013.01); *G01N 33/54326* (2013.01); *G01N 33/58* (2013.01);
(Continued)

(58) Field of Classification Search
CPC ...... A61B 6/587; A61B 6/588; A61M 1/3486; A61M 1/3601; A61M 1/3618; A61M 1/3683; A61M 2202/0021; A61M 2202/0028; A61M 2202/0413; A61M 2205/057; A61N 5/1048; A61N 2005/1051; A61N 2005/1052; B03C 1/00; B03C 1/005; B03C 1/01; B03C 1/04; B03C 1/06; B03C 1/08; B03C 2201/18; B03C 2201/26; B01L 3/502761; B01L 2400/043; G01N 33/54326; G01N 33/58
See application file for complete search history.

(56) References Cited

U.S. PATENT DOCUMENTS

2019/0255356 A1* 8/2019 Tubin ................... A61N 5/1039

OTHER PUBLICATIONS

Chen et al., Biomicrofluidics 14, 041502, pp. 1-16 (2020).*
(Continued)

*Primary Examiner* — John Kim
(74) *Attorney, Agent, or Firm* — William H. Dippert; Laurence A. Greenberg; Werner H. Stemer (57) ABSTRACT

Devices for monitoring cancerous cells in blood of a patient that are preloaded with a marker and a magnetic agent and removing them are provided. The device comprises a tray onto which blood withdrawn from the patient flows before returned to the patient; a magnet placed at a distance from the tray so that the blood on the tray is within a magnetic field of the magnet and the cancerous cells that are preloaded with the magnetic agent are forced to move from the blood on the tray towards the magnet. A detector configured to detect the marker in the cancerous cells in the blood on the tray is provided as well and a filter that is placed between the tray and the magnet so as to capture the cancerous cells that are forced to move towards the magnet and remove them from the blood of the patient.

11 Claims, 4 Drawing Sheets

(51) Int. Cl.
  *A61M 1/34*     (2006.01)
  *A61M 1/36*     (2006.01)
  *A61N 5/10*     (2006.01)
  *B01L 3/00*     (2006.01)
  *B03C 1/00*     (2006.01)
  *B03C 1/005*    (2006.01)
  *B03C 1/01*     (2006.01)
  *B03C 1/04*     (2006.01)
  *B03C 1/06*     (2006.01)
  *B03C 1/08*     (2006.01)
  *G01N 33/543*   (2006.01)

(52) U.S. Cl.
  CPC ............ *A61M 2202/0021* (2013.01); *A61M 2202/0028* (2013.01); *A61M 2202/0413* (2013.01); *A61M 2205/057* (2013.01); *A61N 2005/1051* (2013.01); *A61N 2005/1052* (2013.01); *B01L 2400/043* (2013.01); *B03C 2201/18* (2013.01); *B03C 2201/26* (2013.01)

(56) References Cited

OTHER PUBLICATIONS

Xu et al., Biomaterials 32, 9758-9765 (2011).*
Wang et al., Applied Materials & Interfaces 11, pp. 39586-39593 (2019).*

* cited by examiner

FIG. 4

DEVICES AND METHODS FOR REMOVING CANCER CELLS FROM BLOODSTREAM DURING CANCER METASTASIS

CROSS-REFERENCE TO RELATED PATENT APPLICATION

This patent application is a continuation of co-pending U.S. patent application Ser. No. 19/053,972, filed Feb. 14, 2025, incorporated herein by reference in its entirety.

TECHNICAL FIELD

The present disclosed subject matter relates to cancer treatment. More particularly, the present disclosed subject matter relates to devices and methods for removing cancer cells from the bloodstream.

BACKGROUND OF THE INVENTION

When normal cells start to uncontrollably multiply and spread, they become cancerous cells. The genes send instructions to the cells when to start or stop growing, as an example. Normal cells follow these instructions, but cancerous cells ignore the instructions.

Cancer is the second most common cause of death in the U.S. and is the second most common cause of death worldwide. Researchers estimate that in 2024, over 2 million people living in the U.S. have received a cancer diagnosis, and over 611,000 people died from the disease. Early detection of the disease is a major factor in curing cancer and helping people with cancer to live longer. However, many people are not detected in an early stage and are going through more developed stages of the disease that involve a process of Metastasis.

Metastasis happens when cancer spreads beyond the place where it started to other areas of the body. Nearly all cancers have the potential to metastasize. Metastases can occur in three ways by which the cancer cells can:
  Grow directly into the tissue surrounding the primary tumor.
  Travel through the bloodstream to distant locations like other organs or bones.
  Move through the lymphatic system to nearby or distant lymph nodes.

BRIEF SUMMARY OF THE INVENTION

The present subject matter is aimed at capturing cancer cells and removing them from the bloodstream.

According to a first aspect of the present disclosed subject matter, a device and a method are provided to remove cancer cells from the bloodstream without the need for chemotherapy, and with minimum damage to healthy blood cells.

According to another aspect of the present subject matter, it is provided a device through which cancer cells can be quantifies and captured. The device for monitoring cancerous cells in blood of a patient and removing them, wherein the cancerous cells are preloaded with a marker and a magnetic agent, comprises:
  a tray onto which blood withdrawn from the patient flows before returned to the patient;
  a magnet placed at a distance from the tray so that the blood on the tray is within a magnetic field of the magnet, wherein the cancerous cells that are preloaded with the magnetic agent are forced to move from the blood on the tray towards the magnet;
  a detector configured to detect the marker in the cancerous cells in the blood on the tray;
  a filter placed between the tray and the magnet so as to capture the cancerous cells that are forced to move towards the magnet and remove them from the blood of the patient.

According to another embodiment of the present subject matter, blood is continuously withdrawn from the patient, is inserted into the device through an inlet tube, flows through the tray, and returns to the patient through an outlet tube, and wherein the blood pressure within the inlet tube and the outlet tube is continuously monitored.

According to another embodiment of the present subject matter, the magnet is an electromagnet that has an adjustable power.

According to another embodiment of the present subject matter, the magnet is a permanent magnet and wherein the distance is changeable so that that magnetic field is changed and a force exerted onto the blood in the tray is adjustable.

According to another embodiment of the present subject matter, the magnet comprises a plurality of permanent magnets made of different materials, each having different magnetic force, and wherein the plurality of permanent magnets can be exchanged.

According to another embodiment of the present subject matter, physical conditions of the plurality of permanent magnets are changeable.

According to another embodiment of the present subject matter, the marker is selected from a group of markers consisting of PDG, C-11 Methionine, Choline (F-18 or C-11), and Ga-68 DOTATAT, Tc-99m (Technetium-99m), In-111 (Indium-111), Tc-99m Sestamibi, or fluorescence dyes.

According to another embodiment of the present subject matter, the magnetic agent is iron oxide nanoparticles.

According to another embodiment of the present subject matter, the magnetic agent and the marker are physically or chemically combined.

According to another embodiment of the present subject matter, the device further comprises a laser generator configured to illuminate the blood on the tray.

According to another embodiment of the present subject matter, the marker is PDG and the detector is PET scanner.

In accordance with yet another aspect of the present subject matter, a method of monitoring cancerous cells in blood of a patient and removing them from the blood is provided that comprises:
  preloading the cancerous cells in the blood with a marker and a magnetic agent;
  continuously withdrawing the blood from the patient and returning it to the patient;
  when the blood is withdrawn, streaming the blood onto a tray;
  magnetically forcing the cancerous cells that are preloaded with the magnetic agent to move from the tray towards a magnet placed at a distance from the tray;
  capturing and removing the cancerous cells that are moving towards the magnet by a filter positioned between the magnet and the tray;
  detecting the marker in the cancerous cells and continuously estimating a number of cancerous cells in the blood on the tray;
  determining a threshold;
  stopping the withdrawal of the blood upon passing the threshold.

According to another embodiment of the present subject matter, the method further comprises adjusting a power of the magnet.

According to another embodiment of the present subject matter, the magnet is an electromagnet or a permanent magnet.

According to another embodiment of the present subject matter, the method further comprises continuously comparing the number of cancerous cells in the blood to the threshold.

According to another embodiment of the present subject matter, a magnetic power of the magnet is adjustable according to a result from said continuously comparing the number of cancerous cells in the blood to the threshold.

According to another embodiment of the present subject matter, the method further comprises physically or chemically combining the magnetic agent and the marker.

According to another embodiment of the present subject matter, the method further comprises providing baffles to the tray so as to homogeneously spread the blood onto the tray.

According to another embodiment of the present subject matter, the marker is PDG and said detecting the marker is performed using PET scan.

According to another embodiment of the present subject matter, the method further comprises illuminating the blood on the tray so as to detect the marker in the blood.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Cancer patients in late stages of the disease are going through a process of metastases. The present subject matter addresses capturing the cancer blood cells from the bloodstream and removing them from the blood circulation. Any blood cell can be removed using the device and method of the present subject matter including small cell lung cancer (SCLC) and non-small cell lung cancer (NSCLC) such as large cell carcinoma (CLL). In accordance to a first aspect of the present subject matter, a device is provided for monitoring cancerous cells in blood of a patient and removing them, wherein the cancerous cells are preloaded with a marker and a magnetic agent, the device comprising:

a tray onto which blood withdrawn from the patient flows before returned to the patient;

a magnet placed at a distance from the tray so that the blood on the tray is within a magnetic field of the magnet, wherein the cancerous cells that are preloaded with the magnetic agent are forced to move from the blood on the tray towards the magnet;

a detector configured to detect the marker in the cancerous cells in the blood on the tray;

a filter placed between the tray and the magnet so as to capture the cancerous cells that are forced to move towards the magnet and remove them from the blood of the patient. In accordance with another embodiment of the present subject matter, a method is provided of monitoring cancerous cells in blood of a patient and removing them from the blood comprising:

preloading the cancerous cells in the blood with a marker and a magnetic agent;

continuously withdrawing the blood from the patient and returning it to the patient;

when the blood is withdrawn, streaming the blood onto a tray;

magnetically forcing the cancerous cells that are preloaded with the magnetic agent to move from the tray towards a magnet placed at a distance from the tray;

capturing and removing the cancerous cells that are moving towards the magnet by a filter positioned between the magnet and the tray;

detecting the marker in the cancerous cells and continuously estimating a number of cancerous cells in the blood on the tray;

determining a threshold;

stopping the withdrawal of the blood upon passing the threshold.

Figure 1:
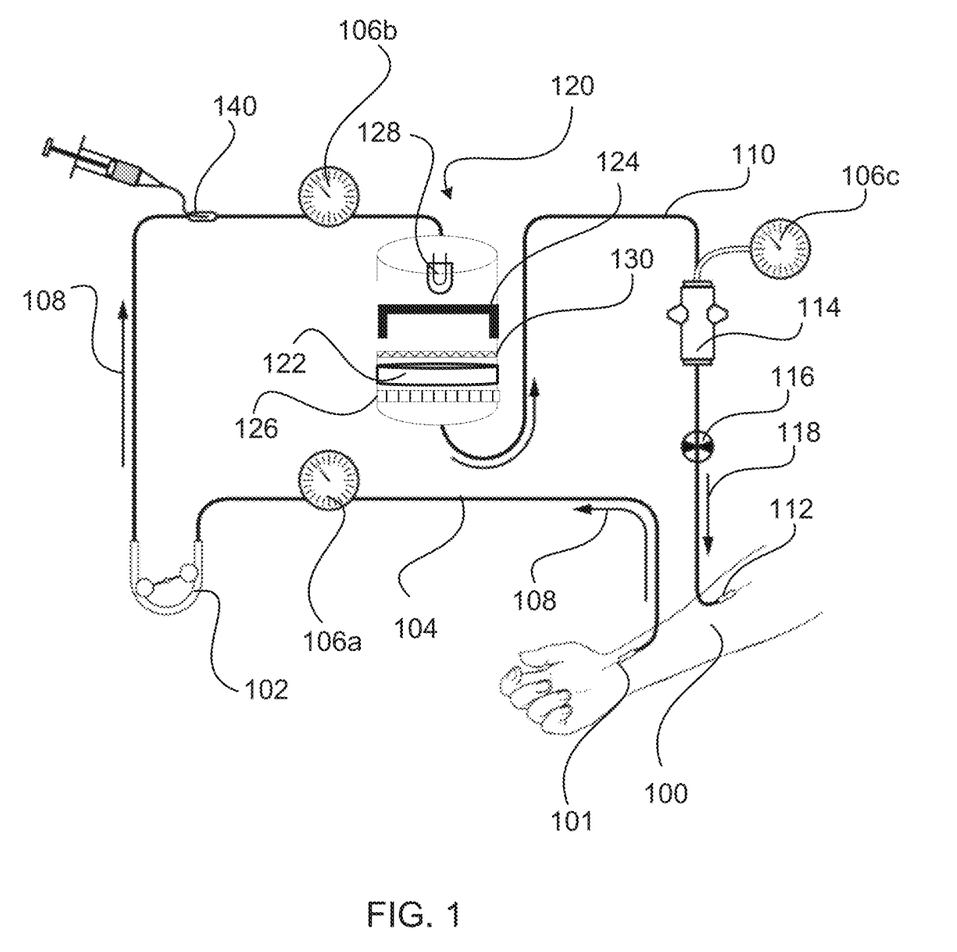
FIG. 1 schematically illustrates a system for capturing cancerous blood cells provided with a device for removing cancer cells from bloodstream of a patient, in accordance with some exemplary embodiments of the disclosed subject matter.

Reference is now made to FIG. 1 schematically illustrating a system for capturing cancerous blood cells provided with a device for removing cancer cells from bloodstream of a patient, in accordance with some exemplary embodiments of the disclosed subject matter.

First, blood is withdrawn from an arm of the patient 100 through a needle 101 using similar methods that are used in other blood cleaning procedures, such as hemodialysis. Other acceptable parts of the patient's body are possible for withdrawal of blood. The blood is transferred using a pump 102, from the vein of the patient, through an inlet tube 104, and into a device for removing cancer cells 120. Optionally or additionally, pressure monitors 106a and 106b can be provided on inlet tubes 104 in different locations to monitor the blood pressure. Preferred locations for monitoring the blood pressure are after blood withdrawal and before entering the device, respectively, for removing cancer cells 120. Those locations are provided as examples. The blood flowing direction is indicated by arrows 108—from the patient's arm 100 to the device for removing cancer cells 120.

Blood enters the device for removing cancer cells 120 after treatments provided to the patient. The treatment is performed prior to the withdrawal of the blood from the patient by which the patient is injected with two types of substances:

A radioactive agent that is preloaded by the cancerous blood cells so as to mark and quantify them. An example of such an agent being massively consumed by cancerous cells in comparison to healthy blood cells is radioactive glucose such as Fluorodeoxyglucose ($^{18}F$). This marker can be observed within the blood of the patient in the body as well as in the device for removing cancer cells 120.

A magnetic agent that is also consumed by cancerous cells and turns the cancerous cells into magnetically active. An example of such an agent is iron oxide nanoparticles (IONP).

It should be mentioned that the two agents, the marker and the magnetic agent, should be injected simultaneously into the patient's bloodstream. Therefore, the marker and the magnetic agent should be chemically or physically combined. This can be performed in several ways such as encapsulating both agents into a liposomes/lipid nanoparticles (LNPs) or polymeric nanoparticles. According to another possibility, the magnetic metallic nanoparticles iron oxide can be functionalized with the marker to produce a combined nanoparticle. The agents can also be loaded into extracellular vesicles (EVs) or exosomes. Other means can be used as well without limiting the scope of the present subject matter.

It should also be noted that preferably and in order to ensure that the agents are actually preloaded before the treatment onto the cancerous blood cells, before loading the cells with the agents, an IV injection of a nutrition solution that is glucose free so that when the agents are being provided, the healthy blood cells will not consume them and a vast majority of the agent will be loaded onto the cancerous cells that tend to consume much more than healthy cells.

Blood enters the device for removing cancer cells 120 when both agents are concentrated within the cancerous cells. Within the device for removing cancer cells 120, a portion of the blood, between 0.5 to 1 liter, flows from the entry to the device so as to flow within a tray 122. The blood is spread throughout the tray. Baffles or partitions can be provided to the tray so as to spread the blood substantially evenly on the tray. Evenly spreading the blood on the tray can also assist ion maintaining the blood in a predetermined time on the tray. Parallel to the tray 122, an adjustable magnet 124 is provided. The force of the electromagnetic field that surrounds the adjustable magnet 124 reaches the whole surface of the tray 122 so that when blood is flown through the tray, the magnetic field is affecting every magnetically susceptible composition that are sustained on the surface of the tray 122. As mentioned hereinbefore, the cancerous blood cells are loaded with IONP that is susceptible to the magnetic field forced by adjustable magnet 124. The magnet is controlled so that the force of the magnetic field can be adjusted according to the process in which the blood is being cleaned of cancerous blood cells. It is preferable to use an electromagnet that can be easily adjusted by changing the electric current that passes through the coil of the magnet. Optionally or additionally, it is possible to use a permanent magnet. In this case, it is harder to adjust the magnetic field. The easiest way to adjust the force of the magnet is to change the temperature of the magnet, however, it is optional to provide a set of magnets made from several materials that can be changeable.

The device for removing cancer cells 120 is further provided with a detector 126 that can detect the marker molecules that are concentrated in the cancerous cells. In case (18F), which is also named PDG, is used, the detector 126 is detecting gamma radiation. Detector 126 can be based on positron emission tomography (PET) scanner that forms images based on the location and intensity of the emitted gamma radiation.

Optionally or additionally, other markers and methods of detection can be used in order to detect the cancerous cells and distinguish them from the healthy cells. PET scanner can also detect C-11 Methionine, Choline (F-18 or C-11), and Ga-68 DOTATAT.

Optionally or additionally, single-photon emission computed tomography (SPECT) scanners can detect markers such as Tc-99m (Technetium-99m), In-111 (Indium-111), Tc-99m Sestamibi.

Optionally or additionally, fluorescent dyes can be used as markers that are being detected by optical imaging systems. Fluorescent-labeled antibodies and quantum dots can also be detected using optical imaging systems.

Optionally or additionally, cancerous cells in the blood that were loaded with markers that are detected using optical imaging systems can be illuminated using a laser beam generated from a laser generator 128. The laser generator 128 will be operated so as to illuminate markers that are possibly attached within the cancerous cells and identify them using detector 126.

Optionally or additionally, at least one filter 130 is provided preferably between the blood tray 122 and the magnet 124. When magnet 124 is operable and the blood in the blood tray 122 contains cancerous blood cells that are loaded with the magnetic agent, the cancerous blood cells will be drawn by the magnetic force of magnet 124 towards the magnet. Those magnetic cancerous blood cells will move towards the magnet and will be trapped in filter 130. The filter filled with the magnetic cells can be washed or exchanged.

After the blood is spread in the blood tray 122, where it is being treated, it is removed from the device for removing cancer cells 120 through an outlet tube 110 and returns to the body circulation of the patient in the direction of the arrow 118 through needle 112. Outlet tube 110 passes through a blood pressure monitor 106c and through air trap and air detector 114. Optionally or additionally, air clamp 116 is provided also on outlet tube 110 so as to prevent air bubbles from entering the blood circulation.

Optionally or additionally, inlet tube 104 is connected with heparin pump 140 that is injecting heparin to the blood in order to prevent clotting of the blood within the tubes and the device.

Figure 2:
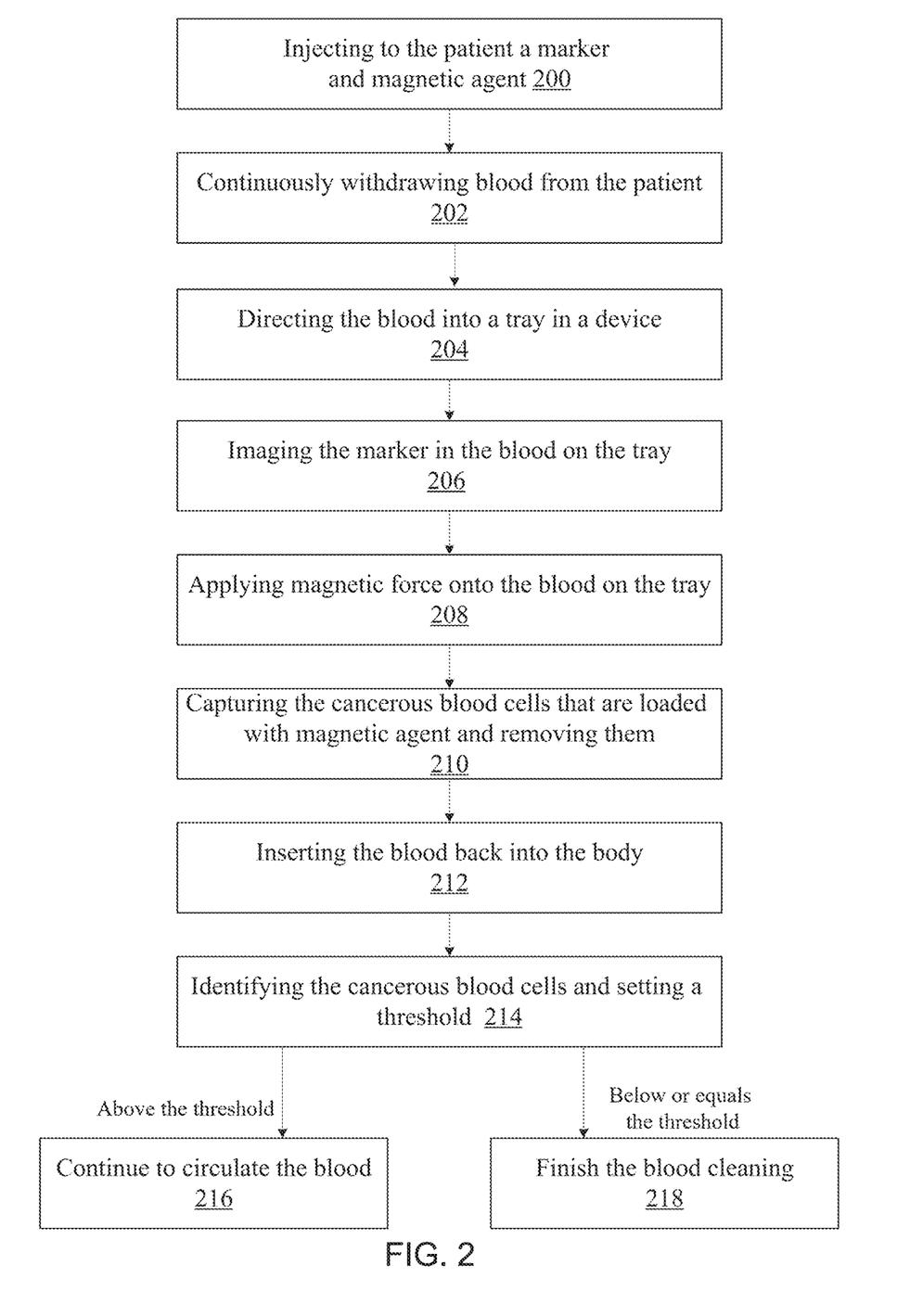
FIG. 2 illustrates steps in a method of capturing cancerous blood cells and removing them from the bloodstream.

As stated hereinbefore, the present subject matter addresses capturing the cancer blood cells from the bloodstream and removing them from the blood circulation. The method through which the removal of the cancerous blood cells is performed is as follows:

Reference is now made to FIG. 2 illustrating steps in a method of capturing cancerous blood cells and removing them from the bloodstream.

The patient for whom the blood is to be cleaned is verified to be in a stage of metastasis in which cancerous cells are present in the blood circulation. In such cases, the method of the present subject matter is applied onto the patient. It is preferred that any tumors that exist in the patients body will be removed before the procedure of cleaning the blood from cancerous cells starts.

The patient is being injected with two agents 200—the first one is a marker agent that can be imaged within the blood. As explained herein before, if the agent is PDG, as an example, a PET scanner will be used to identify the agent in the blood. In this explanation of the method, the marker will be referred to as PDG. The second agent that is injected into the bloodstream of the patient is a magnetic agent such as IONP. The iron oxide can be incorporated within gold nanoparticles or within carbon nanotubes. Magnetically modified magnesium oxide nanoparticles can be used as well as magnetic agent.

After a predetermined time in which the cancerous blood cells have been loaded with both agents, blood is withdrawn from the body of the patient 202 in a continuous manner and is being returned to the body simultaneously. The withdrawn blood is directed to a device in which there is a tray. The blood is directed to be spread all through the surface of the tray 204 so that about 0.5 or 1 liters of blood are received within the tray. The blood is adapted to be arranged in a relatively thin film.

The marker PDG in the cancerous blood cells is imaged 206 using a PET scanner, as an example. The number of cancerous blood cells is estimated through regular methods of counting or assessing areas that are being marked with the marker. Optionally or additionally, an initial image is taken from which a threshold will be set, as will be explained herein after.

When the blood is on the tray, covering its surface in a thin layer, a magnet that is placed with its attracting surface parallel to the thin film of blood is activated, in case an electromagnet is used, and is constantly operated in case a permanent magnet is being used, while applying magnetic force on the blood 208. As mentioned herein before, the second agent that is being preloaded onto the cancerous cells in the blood is a magnetic agent and therefore, the magnetic cells will start moving towards the magnet.

Optionally and additionally, a filter is preferably positioned between the magnet and the film of blood on the tray so that the magnetic cancerous cells that are attracted by the magnet and are starting to more towards it, will be captured and trapped within the filter 210. Optionally or additionally, the filter can be cleaned using a cleaning apparatus or can be exchanged with a clean filter every predetermined interval of time.

As mentioned herein before, the blood is being withdraw from the body and returned to it continuously and simultaneously. Blood returns to the body 212 while the cancerous blood cells are not returning with the blood to the body and are being trapped within the filter. In each cycle, there are less cancerous cells in the blood.

During the whole process, the cancerous blood cells are being quantified through the detection system while a threshold is set 214. As mentioned hereinbefore, the detection system such as the PET scanner is producing images in which the amount of markers, which is associated with the amount of cancerous cells, is estimated. The threshold that is being set can be a threshold that is determined according to the situation of the specific patient, the amount of treatment that he needs, the stage of cancer he is on, and additional factors that are determined through a management protocol of the medical staff. As mentioned hereinbefore, an initial image was taken at the beginning of the process. This image can provide the amount of cancerous cells that are present in the bloodstream at the beginning of the process and accordingly, the threshold can be set to be a certain percentage of the initial counting of cells, as an example.

Optionally or additionally, blood tests can be performed using orthodox methods in order to estimate the number of cancerous cells in the bloodstream.

As the process continues and the amount of cancerous cells in each cycle through the magnet is reduced in the bloodstream, the detector continues to monitor the amount of cancerous cells in the blood. The amount of cancerous blood cells is being compared to the set threshold in predetermined intervals of time while if the threshold is still below the amount of cancerous blood cells, the process continues 216. If the threshold is reached or the number of cancerous cells is below the threshold, the circulation of blood through the magnet can be stopped 218.

It should be noted that it is possible, as another verification of the process, to have a body PET scan before the procedure starts and after its end in order to have better estimation as of the success of the treatment.

It should be also noted that due to the possibility that there is some loss of blood during the procedure since some of the healthy cells can by loaded with the magnetic agent, blood donations can be performed during the process or immediately after.

Figure 3:
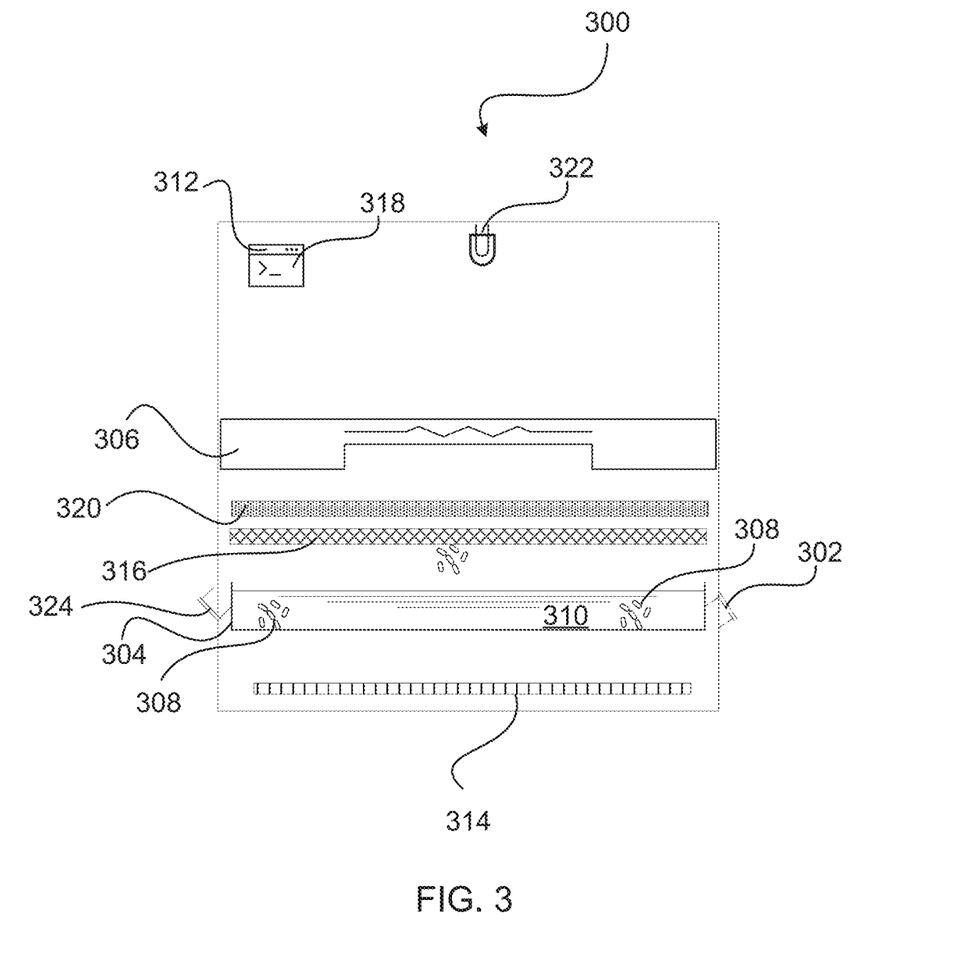
FIG. 3 schematically illustrates a more detailed view of the device for removing cancer cells from the blood, in accordance with some exemplary embodiments of the disclosed subject matter, and FIG. 4 schematically illustrates a more detailed view of another device for removing cancer cells from the blood, in accordance with some exemplary embodiments of the disclosed subject matter.

Reference is now made to FIG. 3 schematically illustrating a more detailed view of the device for removing cancer cells from the blood, in accordance with some exemplary embodiments of the disclosed subject matter.

After explanations of the method and the basic system by which cancerous blood cells in a cancer stage of metastasis are being eliminated from the body of the patient, a more detailed description of the elements of the device itself is provided. The device for removing cancer cells from the blood 300 is provided with an inlet 302 through which blood is inserted to within the device 300. The blood is directed towards a tray 304 that is positioned within the device beneath a magnet 306. The blood, as mentioned hereinbefore, contains cancerous blood cells that are uploaded with two agents-a marker agent and a magnetic agent. The cancerous blood cells 308 are dispersed within the blood 310 in the tray 304 among healthy blood cells that are not marked and not magnetic. Optionally or additionally, magnet 306 is an electromagnet that can be activated when the process of cleaning the blood starts. Upon activation of magnetic force from electromagnet 306, the blood cells that are cancerous and are loaded with the magnetic agent are drawn toward magnet 306.

Optionally or additionally, electromagnet 306 is adjustable and can be controlled through an interface 312. A caretaker can manually change the current that passes through the electromagnet to change the magnetic force that is applied onto the surrounding, hence onto the blood 310 in the tray 304 that contains the cancerous magnetic blood cells 308. Optionally or additionally, electromagnet 306 is fed with a program through which the current; hence, the magnetic force, is changed automatically in a manner in which the magnetic force is decreased or increased over time and cycles of blood passing through the tray. The magnetic force can also be changed in accordance with the current concentration of cancerous blood cells 308 present on the tray 304. As mentioned hereinbefore, a detector 314 is provided to monitor the concentration of the cancerous blood cells 308 present on the try 304.

Detector 314 is positioned adjacent to the tray 304 so as to monitor the marked cancerous cells 308 on the tray. Calculations can be performed as for the amount or concentration of the cancerous cells in every cycle the blood takes or in any time interval that is needed. Accordingly, the magnetic force can be changed.

Between magnet 306 and the blood 310 in the tray 304, a filter 316 is provided. When the cancerous blood cells 308 are withdrawn to magnet 306, they are being captured by filter 216. The filter can be any filter having mesh between 10 to 20 microns. As the process of cleaning the blood from cancerous cells continues, the blood that passes in every cycle through the device 300 is cleaner from the cancerous cells.

Optionally or additionally, a controller 318 is provided that can be incorporated within the interface 312 or separated from it. The controller 318 may receive the images from detector 314 and calculate the decay of the number of cancerous cells in the blood as time passes. Accordingly, a threshold can be set by controller 318 that indicates the end of the process.

Optionally or additionally, an additional filter 320 or more than one is provided adjacent to filter 316 in order to capture cancerous cells that were not captured by filter 316.

Optionally or additionally, an illuminator 322 is provided to be used in case the markers that were loaded onto the cancerous cells are glowing and can be detected by detector 314 when illuminated with laser beam or any other illumination that is needed in order to monitor the marked cancerous cells 308 in the blood 310 in the tray 304.

The visualization of the cancerous cells provides input to the evolution of the process within the device. During the process, the cancerous blood cells are captured and removed from the bloodstream while the healthy cells remain intact. One of the main advantages of the process is that it is performed outside the body of the patient, within the device while no harm is done to other cells or tissues of the patient as occurs in chemotherapy or radiation, as examples.

In order for the cycles to proceed, the blood from the tray 304 that is cleaner is getting back to the patient through an outlet 324.

Optionally, in case a permanent magnet is used rather than an electromagnet, the adjustment of the current is somehow more complicated.

Figure 4:
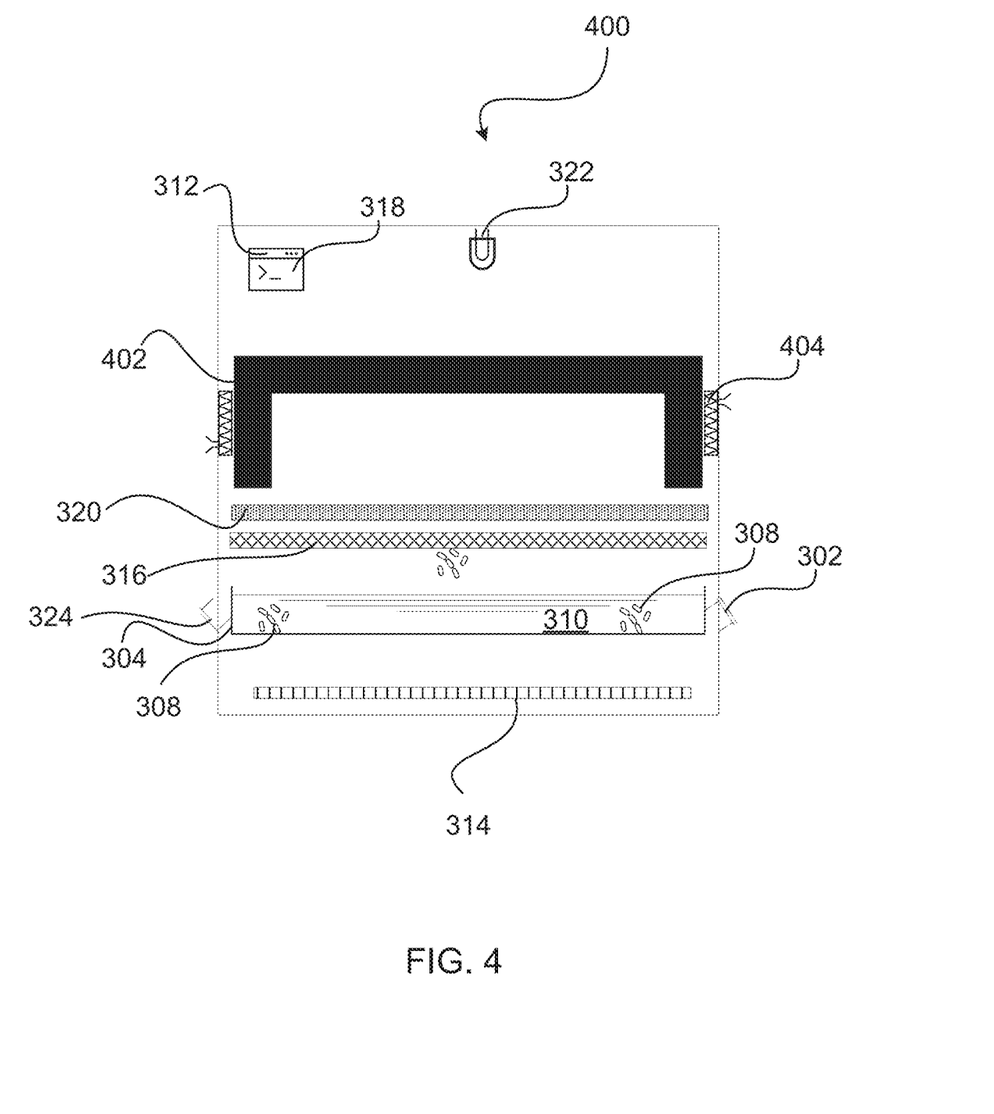

Reference is now made to FIG. 4 schematically illustrating a more detailed view of another device for removing cancer cells from the blood, in accordance with some exemplary embodiments of the disclosed subject matter.

A device for removing cancer cells from the blood 400 is similar in most of its parts to the device 300, however, the device 400 is provided with a permanent magnet 402, that is constantly operated. In order to have control over the magnetic force applied on the tray 304 and the magnetic cancerous cells 308 therewithin, the magnet 402 can be vertically moved so that the distance of the magnet from the tray is changed. One method by which the magnet 402 is moved vertically is by providing conveyors 404 at least on both sides of the magnet 402 so that the magnet can move and change its vertical position. The change of the distance between magnet 402 and the blood tray 304 can be controlled manually through interface 312 or automatically through controller 318. Other methods of changing the magnetic force can be applied to the device.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for monitoring cancerous cells in blood of a patient and removing them, wherein the cancerous cells are preloaded with a marker and a magnetic agent in vivo, the device comprising:
   a tray onto which blood continuously withdrawn from the patient flows and spreads, before being returned to the patient;
   a magnet placed at a distance from the tray so that the blood on the tray is within a magnetic field of the magnet, wherein the cancerous cells that are preloaded with the magnetic agent are forced to move from the blood on the tray towards the magnet;
   a detector configured to detect the marker in the cancerous cells in the blood on the tray; and
   a filter placed between the tray and the magnet to capture the cancerous cells that are forced to move towards the magnet and remove them from the blood of the patient.

2. The device for monitoring cancerous cells in blood of a patient and removing them according to claim 1, wherein blood is inserted into the device through an inlet tube, flows through the tray, and returns to the patient through an outlet tube, and wherein the blood pressure within the inlet tube and the outlet tube is continuously monitored.

3. The device for monitoring cancerous cells in blood of a patient and removing them according to claim 1, wherein the magnet is an electromagnet that has an adjustable power.

4. The device for monitoring cancerous cells in blood of a patient and removing them according to claim 1, wherein the magnet is a permanent magnet and wherein the distance is changeable so that that magnetic field is changed and a force exerted onto the blood in the tray is adjustable.

5. The device for monitoring cancerous cells in blood of a patient and removing them according to claim 1, wherein the magnet comprises a plurality of permanent magnets made of different materials, each having a different magnetic force, and wherein the plurality of permanent magnets can be exchanged.

6. The device for monitoring cancerous cells in blood of a patient and removing them according to claim 5, wherein physical conditions of the plurality of permanent magnets are changeable.

7. The device for monitoring cancerous cells in blood of a patient and removing them according to claim 1, wherein the marker is selected from a group of markers consisting of flourodeoxyglucose, C-11 Methionine, Choline (F-18 or C-11), Ga-68 DOTATAT, Tc-99m (Technetium-99m), In-111 (Indium-111), Tc-99m Sestamibi, and fluorescence dyes.

8. The device for monitoring cancerous cells in blood of a patient and removing them according to claim 1, wherein the magnetic agent is iron oxide nanoparticles.

9. The device for monitoring cancerous cells in blood of a patient and removing them according to claim 1, wherein the magnetic agent and the marker are physically or chemically combined.

10. The device for monitoring cancerous cells in blood of a patient and removing them according to claim 1, wherein the device further comprises a laser generator configured to illuminate the blood on the tray.

11. The device for monitoring cancerous cells in blood of a patient and removing them according to claim 1, wherein the marker is flourodeoxyglucose and the detector is a positron emission tomography scanner.

* * * * *